Oct. 25, 1938.    H. F. SWENSON    2,134,268
ICE CREAM FREEZER
Filed Jan. 22, 1936
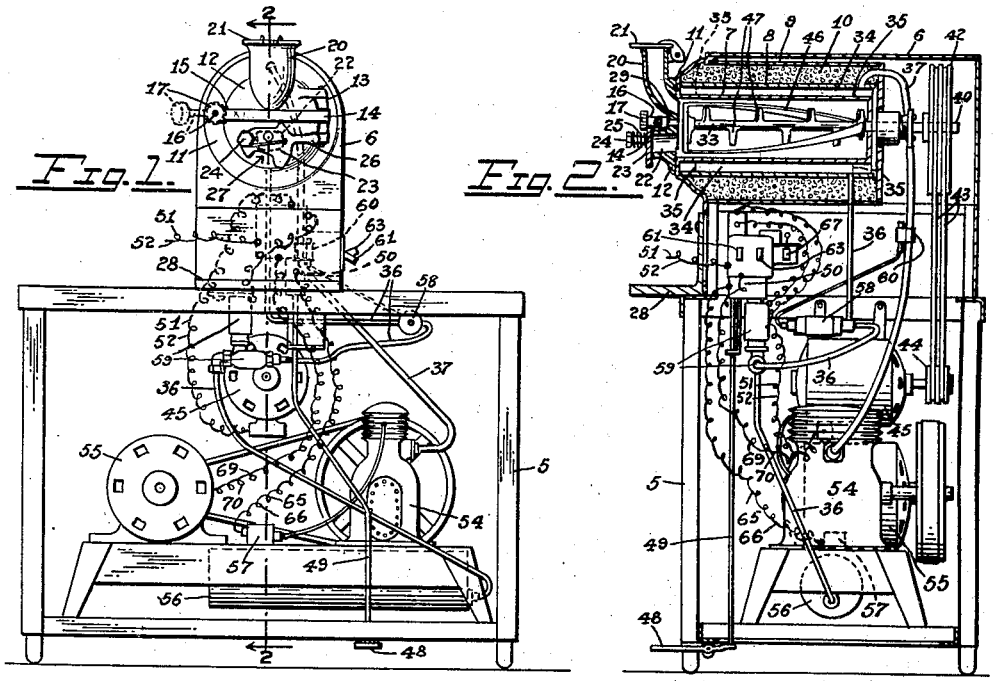
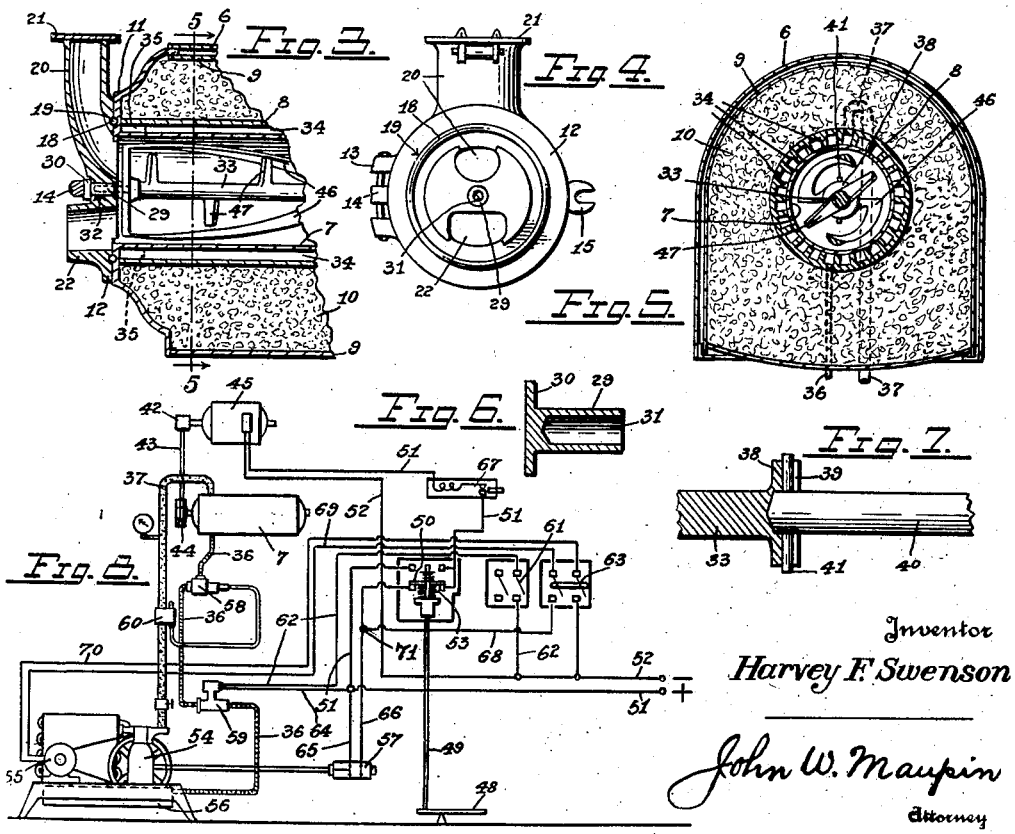
Inventor
Harvey F. Swenson
John W. Maupin
Attorney Patented Oct. 25, 1938

2,134,268

UNITED STATES PATENT OFFICE 2,134,268

ICE CREAM FREEZER

Harvey F. Swenson, Seattle, Wash.

Application January 22, 1936, Serial No. 60,213

3 Claims. (Cl. 259—9)

My invention relates to ice cream freezers and particularly to an ice cream freezer that is adapted for use in ice cream parlors, hotels, drug stores and restaurants where the ice cream is served to the trade directly from the freezer.

Certain mechanical objects of the invention are first, to provide an ice cream machine having a freezer drum equipped with a plurality of fins or splines whereby the area of the freezing transfer surface is considerably increased, and a uniform passage is provided for the flow of the refrigerant whereby settling and collection of lubricant on metal surfaces in the refrigeration system is eliminated; second, to provide a foot pedal for electrical operation and control of the freezer whereby ice cream may be discharged directly from the freezer drum into receptacles thus leaving both hands free to handle the receptacles; third, to provide a cut-off door for the discharge port of the drum which door is designed and shaped in such manner that both large and small receptacles may be equally and readily filled therefrom; fourth, to provide a simplified front bearing for the dasher which is trouble free, simplifies the opening and closing of the drum door, and eliminates expensive replacement cost; and fifth, to provide a leak-proof gasket consisting of a small rubber tube set into an annular groove on the inside of the drum door which is easy to remove, clean or replace.

The most important electrical object of the invention is to provide means whereby the motor of the compressor unit, which unit supplies the compressed refrigerant to the freezer unit, cannot operate without accompanying operation of the freezer motor which operates the dasher of the freezer unit.

In the drawing:

Figure 1 is a view in front elevation of the complete machine; Fig. 2 is a view in vertical section taken substantially on a broken line 2—2 of Fig. 1 and showing certain parts in elevation; Fig. 3 is an enlarged fragmentary view in vertical section of the forward part of the freezer drum and associated parts; Fig. 4 is an enlarged detail view in rear elevation of the drum door and connected parts; Fig. 5 is a view in transverse vertical section taken on a broken line 5—5 of Fig. 3; Fig. 6 is an enlarged detail view in longitudinal section of the front dasher bearing; Fig. 7 is a corresponding view showing the connection of the dasher shaft with the drum stub-shaft; and Fig. 8 is a view in diagram showing both the electrical and refrigerating elements and their arrangement.

Referring in detail to the drawing throughout which like reference designate like parts, the numeral 5 indicates the main frame of the machine which may have a housing 6 superimposed thereon in any desirable manner. A freezer drum 7 is mounted within the housing in any suitable manner, and a refrigerating drum 8 envelopes said freezer drum leaving an expansion chamber therebetween. A sheet metal casing 9 surrounds the refrigerating drum and the space between is filled with cork or other insulative material as shown at 10. The forward ends of the casing and refrigerating drum are closed by a front wall 11 leaving the forward end of the freezer drum open as most clearly shown in Fig. 3 of the drawing.

A drum door 12 is hinged at 13 to the front wall 11. A bar 14 is also connected to the hinge 13 and extends directly across the outside of the door with its forked end 15 arranged to straddle a bolt 16 which is pivotally connected to the front wall 11 and may be swung outwardly as shown in dotted lines in Fig. 1. Said bolt is provided with a knurled hand nut 17, and, when same is screwed down tightly against the forked end 15, the bar 14 will hold the door 12 in a closed leak-proof position. An important feature of the invention resides in the small rubber tube gasket 18 which is fitted into an annular groove 19 provided in the rear surface of the door 12. Thus, when the door is held in the closed position by the bar 14, the gasket will be pressed against the front wall 11 thereby preventing any leakage from the door. The tube gasket may be readily removed for cleaning purposes.

The upper portion of the drum door 12 is provided with a down-spout entry port 20 which communicates directly with the interior of the freezer drum 7 when the door is closed. The ingredients for making ice cream are fed into the drum through this entry port and its top is provided with a hinged lid 21 which excludes dust and other foreign matter. The lower portion of the door 12 is provided with a projecting discharge port 22 which also communicates with the freezer drum when its door is closed. A cut-off door 23 is pivoted to this port by a bolt 24 which has a heavy spring 25 interposed between the head of the bolt and the door for compressing the cut-off door against the open end of the port thus making it leak proof. This door is pivotally raised by a handle 26, and an important feature of this door resides in the somewhat rectangular recess 27 provided in its lower edge portion. This rectangular recess, with its rounded corners, is so shaped that it will permit a small quantity as well as a large quantity of ice cream to be discharged from the port 22, depending upon the distance the door is raised, and thus large as well as small receptacles may be filled with equal facility. When filling receptacles, they are either held in the hands or placed upon the shelf 28 which is secured to the frame 5 or housing 6.

Another important feature resides in the small front bearing 29, shown in detail in Fig. 6, which has a flanged head 30 and a hollow recess 31. This bearing fits into a hole 32 through the drum door 12, between the entry and discharge ports 21 and 22 respectively, and is centrally disposed with respect to the freezer drum 7. Its head 30 bears against the outside of the door and is engaged by the bar 14 which thus serves the double purpose of retaining both the door and the bearing in a closed leak-proof position as will be understood. The recess 31 in this bearing receives the reduced end of the dasher shaft 33 which freely rotates therein. This small front bearing is simple and inexpensive to install and renew, and provides novel means whereby the freezer drum door 12 may be opened and closed without expensive and complicated structure.

The fins or splines 34, which are interposed in the expansion chamber between the freezer and refrigerator drums 7 and 8 respectively, form still another important feature of the invention. These fins are rectangular in cross section and are preferably, though not necessarily, an integral part of the refrigerator drum 8. They extend longitudinally of the drums, each alternate one terminating short of the rear end of the drum and with the other intermediate ones terminating short of the front end of the drum, as shown at 35, so as to form a continuous and circuitous passage back and forth all around the drum. Thus, the refrigerant, which enters the expansion chamber under pressure in the form of liquid through a small pipe 36, divides itself, half flowing around one side of the drum and half going around the other side, and passes out through a larger pipe 37. These splines or fins provide a uniform passage for the flow of the refrigerant around the drum whereby lubricating oil, which is carried in suspension by the refrigerant, is prevented from settling and collecting on the metal surfaces in the refrigerating system, and materially increase the area of the freezing transfer surface, and thus increase the efficiency of the machine.

The rear end of the dasher shaft 33 is enlarged by a flange head 38 which is centrally provided with a recess and groove or slot 39 diametrically across the rear end of the head which recess receives the inner end of a stub shaft 40, and a pin 41 passing therethrough and seated in the groove forms a detachable connection for the rear end of the dasher as shown in Fig. 7. The stub shaft 40 is journaled through the rear end of the freezing and refrigerating drums, and its outer end is provided with a large pulley 42 having belts 43 extending to a small pulley 44 keyed to the shaft of a dasher motor 45. The dasher shaft 33 has a pair of oppositely curved blades 46 secured to or integral with each of its ends which blades rotate in juxtaposition with the inner wall of the freezer drum 7, and a plurality of oppositely disposed flat spaced-apart paddles or fingers 47 integrally connected to the dasher shaft, terminate inside or short of the dasher blades.

The paddles or fingers 47 are so slanted as to cause the semi-frozen ice cream to move forward toward the discharge port 22 when the dasher is rotated, say, in a clockwise direction. A foot pedal 48 is fulcrumed to the lower portion of the frame 5, and a rod 49, which is pivotally connected to said foot pedal, extends upwardly to a foot pedal switch 50. Pressure of the foot upon said pedal causes the switch to rise and close the circuit from lead-in wires 51 and 52 to the dasher motor 45, as shown in the diagram view in Fig. 8. This foot switch is provided with a spring 53 which causes it to return to its normally lowered position when the foot is removed from the pedal, thus shutting off the dasher motor 45. It will thus be seen that this foot pedal and its switch are for momentary use and as a convenience in filling and serving ice cream receptacles. They are of prime importance for the reason that an attendant may fill a half dozen receptacles, such as saucers or cones carried in both hands, by stepping on the foot pedal thus causing the dasher to force the ice cream within the freezer drum 7 into the discharge port 22, and by raising and lowering the cut-off door 23 with the wrist or other disengaged part of the hands or arms. The foot pedal results in quicker service, the use of less electrical power, and in a better quality of ice cream.

A refrigerating unit, comprising a compressor 54, a motor 55 for operating the compressor, a pressure tank 56, and a pressure control switch 57, is mounted on the lower part of the frame 5. It is understood that no claim of novelty is made for the compressor except insofar as it may enter into novel combination with the elements of the ice cream freezer. The small pipe 36 conveys the compressed refrigerant from the pressure tank 56 to the expansion chamber between the freezer and refrigerator drums 7 and 8 respectively wherein the refrigerant expands, creating the necessary frigidity, and then returns through the larger pipe 37 to the compressor 54 and tank 56 thus completing its cycle. I prefer to use methyl chloride as the refrigerant by reason of its nonexplosive nature, although any desired refrigerant may, of course, be used. A pressure of from eighty to one hundred and twenty pounds is maintained by the compressor depending upon conditions of operation, and the pressure switch 57 is connected to the compressor and interposed in the circuit for reasons presently set forth. A thermostatic expansion valve 58 is interposed in the small high pressure pipe 36, and the entire portion of the pipe between said expansion valve and the compressor tank 56, being normally at a partial vacuum or under low pressure, the pressure within said pipe portion will increase upon operation of the compressor and extend into the expansion chamber between the drums 7 and 8 where it will rapidly expand thus absorbing high temperature and creating low temperature which freezes the ice cream mix within the freezer drum 7. A magnetic valve switch 59 is also interposed in the high pressure pipe 36 for reasons presently set forth.

A thermal bulb 60 is connected to the low pressure return pipe 37 and a capillary tube connects said bulb with the thermostatic expansion valve 58, which valve is so adjusted that, when frost is on the low pressure pipe, the bulb causes the said expansion valve to close, thus operating the expansion valve in direct relation and proportion to the temperature or amount of frost on the low pressure return pipe. The frost line does not reach the thermal bulb until the latter stages of freezing takes place when there is less expansion of the refrigerant and a consequent overflow of the same, in the compressed liquid state, into the low pressure pipe 37, whose continued expansion causes low temperature and frost to a point on the return pipe whereby the thermal bulb will be caused to operate and shut off the expansion valve 58, thus enabling the compressor 54 to function more rapidly and increasing the speed of the freezing process.

In the operation of the system, assuming that ice cream mix at a temperature of from forty to seventy degrees Fahrenheit is placed in the freezer drum 7, the freezer hand switch designated by the numeral 61 is manually closed whereby the circuit wire 62 is also closed. The current will flow through the magnetic valve 59, opening same and allowing liquid high pressure refrigerant to pass into the thermostatic expansion valve 58 which allows a measured amount to pass on into the expansion chamber between the drums 7 and 8. It being understood that the double pole compressor hand switch 63 is closed at all times, and inasmuch as the pressure switch 57 is connected to the magnetic valve 59, by wires 64 and 65, and said pressure switch being set to close at a pressure of substantially five pounds, this switch will close and allow the current to flow through a wire 66, through the foot pedal switch 50 in its normally lowered position, through the wire 51 and a thermal coil operated dasher motor switch 67, to the dasher motor 45, operating same and completing its circuit by returning over the wire 52. At the same time the current will also flow through a shunt wire 68, through the double pole hand switch 63, then through a wire 69 to the compressor motor 55, operating same and returning through a wire 70, through the other pole of the compressor hand switch 63 and thus completing its circuit through the wire 52. The thermal switch 67 is provided in case the dasher becomes stalled by over frozen cream or other cause which would build up an overload of current, this switch will throw out thus breaking the circuit and preventing the dasher motor from being burnt out. Provision is also made for operating this thermal switch by hand in cases of emergency.

When the ice cream mix is frozen to the proper consistency, the freezer hand switch 61 is opened which closes the magnetic valve 59 and thus shuts off all flow of the refrigerant. This will cause a partial vacuum to be built up in the compressor 54 by suction thus reducing the compression which causes the pressure switch 57 to open. This pressure switch, being wired in circuit with both the dasher motor 45 and compressor motor 55, both of said motors will be stopped. Herein lies the most important electrical feature of the invention, namely, the compressor motor 55 cannot operate without running the dasher motor 45 for the reason that the current which operates the compressor motor must flow through part of the same circuit which operates the dasher motor, namely through the wire 66, it being understood that the foot pedal switch 50 is in its normally lowered position. For, if we assume that the freezer hand switch 61 is open and the compressor hand switch 63 is closed, it is apparent from the foregoing that the said open hand switch will close the magnetic valve 59 thus reducing pressure of the compressor 54 and thereby causing the pressure switch 57 to open and the wire 66 to be thrown out of circuit. This will prevent current from passing over the wire 68 through the compressor hand switch 63 and to the compressor motor 55 over the wire 69, thus stopping said compressor motor. This feature is important for the reason that it prevents the ice cream mixture within the freezer drum 7 from being frozen solid while in a static condition caused by non-operation of the dasher as will be understood.

The dasher motor 45 may be operated by the foot pedal switch 50 without closing the compressor hand switch 63, and the circuit is so arranged that the dasher motor may be operated by the foot pedal switch independently of the pressure switch 57 or any of the other controls on the machine except the thermal switch 67. In the operation of the foot pedal switch, the current flows through same in its normally lowered position only when the pressure switch 57 is closed, and in this position the dasher motor cannot be operated by said foot pedal switch. However, when pressure is applied to the foot pedal and said foot pedal switch is raised to complete the circuit through the wire 51, which is connected directly to the outside source of power and is alive at all times, the dasher motor will be set in motion. Inasmuch as the compressor motor is wired in ahead of the foot pedal switch at the point designated by the numeral 71, the operation of the foot pedal switch does not effect the operation of the compressor motor. This independent feature of operating the dasher motor is particularly useful in serving ice cream as hereinbefore mentioned.

I claim:

1. In an ice cream freezer comprising a freezer drum having an open end, a front wall surrounding the open end, a door hinged to the front wall and arranged to bear against the front wall and close the open drum end, an outwardly projecting discharge port carried by the door and communicating with the drum, a cut-off door pivoted flatly to the outer end of the port and arranged to open and close the port when it is pivotally swung up and down, and said cut-off door having a rectangular recess in its lower edge portion arranged to be brought into communication with the port when the door is pivotally moved to regulate the size of the port opening.

2. In an ice cream freezer comprising a freezer drum having an open front end, a front wall surrounding the opening, a door hinged to the wall and arranged to close the front end of the drum, said door having a hole therethrough concentric with the drum, a dasher mounted for rotation within the drum and having a central shaft with a reduced projecting end arranged to register with the hole through the door, a small bearing having a recess and a flange head inserted into the hole with its head bearing against the exterior of the door, the recess in the bearing arranged to receive the reduced end of the dasher shaft, a cross bar hinged to the front wall and arranged to engage the flange head of the small bearing, and means for clamping said bar against the head of said bearing.

3. In an ice cream freezer comprising a freezer drum having an open front end, a front wall surrounding the open end, a door hinged to the wall and arranged to close the front end of the drum when the door is swung into engagement with the front wall, said door having a hole therethrough concentric with the drum, a dasher mounted for rotation within the drum and having a central shaft with a reduced projecting end arranged to register with the hole through the door, a small bearing inserted in the hole in the door, said bearing having a recess and a flange head bearing against the exterior of the door, the reduced end of the dasher shaft mounted in the recess of the bearing, a cross bar hinged to the front wall and extending across the door in engagement with the head of the bearing, and means for clamping the cross bar against the head of the bearing whereby same is held in secure engagement with the door and the door is held in secure engagement with the front wall.

HARVEY F. SWENSON.